(12) United States Patent
Coimbatore Annadorai et al.

(10) Patent No.: US 12,524,325 B2
(45) Date of Patent: Jan. 13, 2026

(54) REAL-TIME CPU AVAILABILITY MONITORING

(71) Applicant: Google LLC, Mountain View, CA (US)

(72) Inventors: Lakshman Naresh Coimbatore Annadorai, Newark, CA (US); Keun Young Park, Santa Clara, CA (US); Suresh Batchu, Sunnyvale, CA (US); Edward Dcruz, San Francisco, CA (US); Felipe Leme, Belmont, CA (US); Steven Boray Huang, Palo Alto, CA (US); Kweku Adams, Chicago, IL (US)

(73) Assignee: Google LLC, Mountain View, CA (US)

( * ) Notice: Subject to any disclaimer, the term of this patent is extended or adjusted under 35 U.S.C. 154(b) by 486 days.

(21) Appl. No.: 18/175,499

(22) Filed: Feb. 27, 2023

(65) Prior Publication Data
US 2024/0054060 A1 Feb. 15, 2024

Related U.S. Application Data

(60) Provisional application No. 63/371,375, filed on Aug. 12, 2022.

(51) Int. Cl.
*G06F 11/30* (2006.01)
*G06F 9/50* (2006.01)

(52) U.S. Cl.
CPC ........ *G06F 11/3055* (2013.01); *G06F 9/5027* (2013.01); *G06F 11/3024* (2013.01)

(58) Field of Classification Search
None
See application file for complete search history.

(56) References Cited

U.S. PATENT DOCUMENTS

| 11,003,496 | B2 | 5/2021 | Borlick et al. |
| 11,321,123 | B2 | 5/2022 | Rinaldi et al. |
| 2007/0058547 | A1* | 3/2007 | Berstis ............... G06F 11/3409 370/232 |
| 2009/0228890 | A1 | 9/2009 | Vaitovirta et al. |
| 2012/0216208 | A1 | 8/2012 | Takemura et al. |

(Continued)

FOREIGN PATENT DOCUMENTS

CN 114416466 A 4/2022

OTHER PUBLICATIONS

Android, "Automotive", https://source.android.com/docs/devices/automotive, May 25, 2021, p. 2.

(Continued)

*Primary Examiner* — Craig C Dorais
(74) *Attorney, Agent, or Firm* — Shumaker & Sieffert, P.A.

(57) ABSTRACT

One or more processors of a computing device may determine, based at least in part on one or more processor statistics and one or more processor mode statistics, a processor availability of the one or more processors. The one or more processors may determine, based at least in part on the processor availability of the one or more processors, whether the one or more processors are available to execute one or more tasks. The one or more processors may, in response to determining that the one or more processors are available to execute the one or more tasks, executing, by the one or more processors, the one or more tasks.

18 Claims, 4 Drawing Sheets

(56) References Cited

U.S. PATENT DOCUMENTS

2014/0201371 A1* 7/2014 Gupta ............... H04L 67/1023
                                                    709/226
2018/0004535 A1   1/2018 Hati et al.
2020/0112521 A1* 4/2020 Desai .................... G06F 21/64

OTHER PUBLICATIONS

Monot et al., "Multi-source software on multicore automotive ECUs—Combining runnable sequencing with task scheduling", 2012 IEEE, Jan. 25, 2012, p. 11.
Hossain et al., "Exploiting Resource Profiling Mechanism for Large-Scale Scientific Computing on Grids", Cluster Computing, vol. 19, No. 3, Springer, Jul. 9, 2016, 13 pp.
International Search Report and Written Opinion of International Application No. PCT/US2023/029145 dated Nov. 10, 2023, 11 pp.
Response to Communication Pursuant to Rules 161(1) and 162 EPC dated Jan. 23, 2025, from counterpart European Application No. 23762042.2, filed Jul. 16, 2025, 29 pp.

* cited by examiner

REAL-TIME CPU AVAILABILITY MONITORING

RELATED APPLICATIONS

This application claims priority to U.S. Provisional Application No. 63/371,375, filed Aug. 12, 2022, the entire contents of which is hereby incorporated by reference.

BACKGROUND

A vehicle may include a so-called "head unit" or other integrated computing device that presents an interface (such as a graphical user interface—GUI) by which to control the vehicle systems, such as a heating, ventilation, and air conditioning (HVAC) system, a lighting system (for controlling interior and/or exterior lights), an entertainment system, a seating system (for controlling a position of a driver and/or passenger seat), etc. The head unit may execute applications, such as a virtual assistant application, a navigation application, a music application, and the like that provides various functionalities of the heat unit. During bootup of the head unit, different applications and processes may compete to execute tasks.

SUMMARY

In general, this disclosure describes techniques for monitoring the real-time processor availability of a computing device, such as a vehicle head unit. When the computing device boots up, various applications and/or services may execute various tasks in order for the applications and/or services to be ready for use by a user of the computing device, which may lead to a high processing load for the processors of the computing device. A job scheduler may schedule tasks to be executed based on processor availability and task priority, and may pause scheduling of new tasks to be executed by the processors of the computing device until the job scheduler determines that the processors have a processor availability percentage that is above a specified threshold.

In accordance with aspects of the present disclosure, a computing device may be able to schedule tasks based on the processing loads of the processors of the computing device. A computing device may determine a processor availability of the one or more processors of the computing device. The computing device may determine, based at least in part on the processor availability of the one or more processors, whether the one or more processors are available to execute one or more tasks. The computing device may, in response to determining that the one or more processors are available to execute the one or more tasks, schedule the one or more tasks for execution.

In some aspects, the techniques described herein relate to a method including: determining, by one or more processors and based at least in part on one or more processor statistics and one or more processor mode statistics, a processor availability of the one or more processors; determining, by the one or more processors and based at least in part on the processor availability of the one or more processors, whether the one or more processors are available to execute one or more tasks; and in response to determining that the one or more processors are available to execute the one or more tasks, executing, by the one or more processors, the one or more tasks.

In some aspects, the techniques described herein relate to a computing device including: memory; and one or more processors communicably coupled to the memory and configured to: determine, based at least in part on one or more processor statistics and one or more processor mode statistics, a processor availability of the one or more processors; determine, based at least in part on the processor availability of the one or more processors, whether the one or more processors are available to execute one or more tasks; and in response to determining that the one or more processors are available to execute the one or more tasks, execute the one or more tasks.

In some aspects, the techniques described herein relate to an apparatus including: means for determining, based at least in part on one or more processor statistics and one or more processor mode statistics, a processor availability of one or more processors; means for determining, based at least in part on the processor availability of the one or more processors, whether the one or more processors are available to execute one or more tasks; and means for, in response to determining that the one or more processors are available to execute the one or more tasks, executing the one or more tasks.

In some aspects, the techniques described herein relate to a non-transitory computer-readable storage medium having stored thereon instructions that, when executed, cause one or more processors of a computing device to: determine, based at least in part on one or more processor statistics and one or more processor mode statistics, a processor availability of the one or more processors; determine, based at least in part on the processor availability of the one or more processors, whether the one or more processors are available to execute one or more tasks; and in response to determining that the one or more processors are available to execute the one or more tasks, execute the one or more tasks.

The details of one or more examples are set forth in the accompanying drawings and the description below. Other features, objects, and advantages will be apparent from the description and drawings, and from the claims.

DETAILED DESCRIPTION

Figure 1:
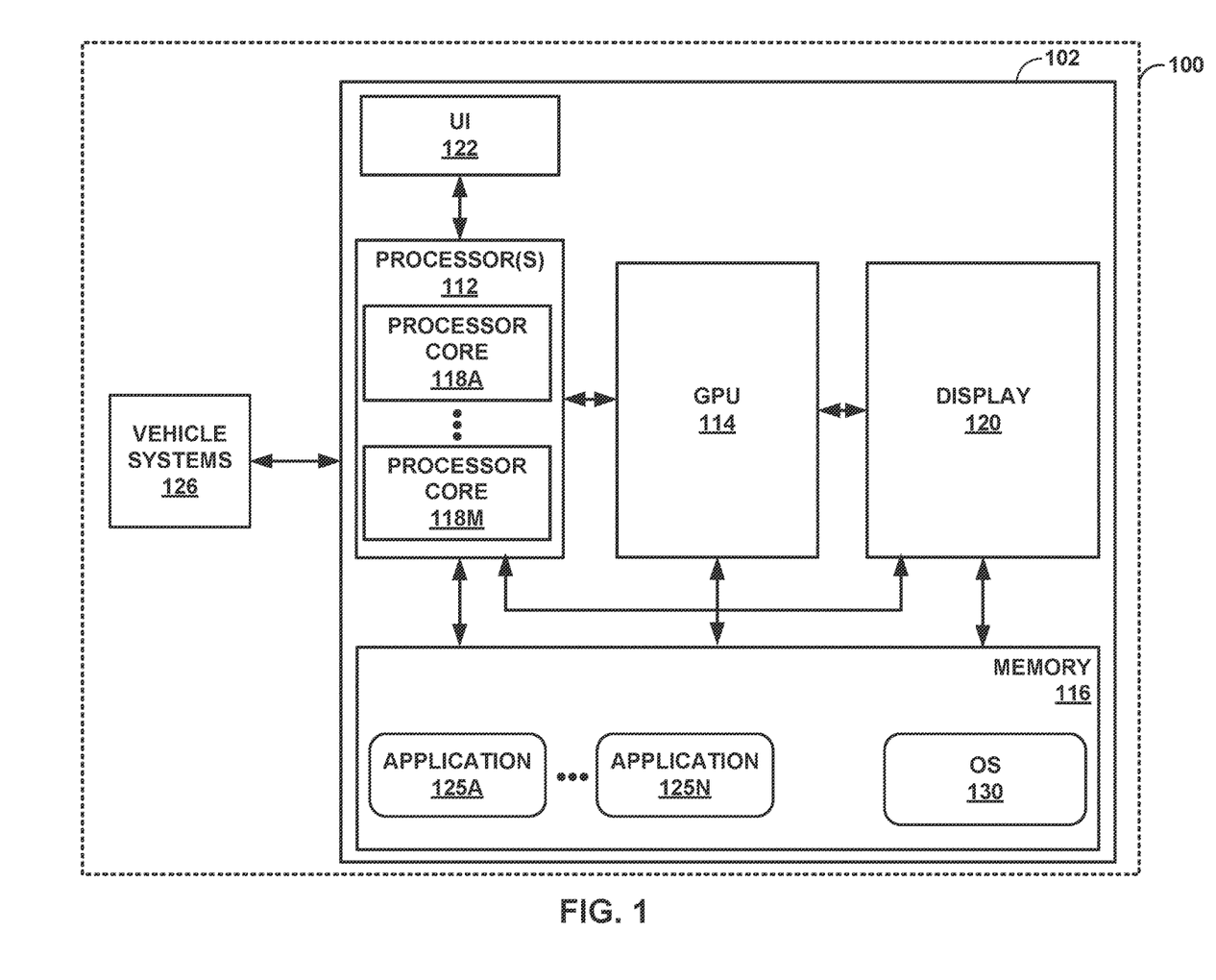
FIG. 1 is a block diagram illustrating an example computing device 102 configured to perform various aspects of the techniques described in this disclosure.

FIG. 1 is a block diagram illustrating an example computing device 102 configured to perform various aspects of the techniques described in this disclosure. In the example of FIG. 1, computing device 102 may be a head unit of vehicle 100. In other examples, computing device 102 may be a mobile computing device, a smart phone, a tablet computer, a wearable computing device, a laptop computer, a desktop computer, a server, or any other suitable computing device.

Vehicle 100 is assumed in the description below to be an automobile. However, the techniques described in this disclosure also applies to any type of vehicle capable of conveying one or more occupants between locations, such as a motorcycle, a bus, a recreational vehicle (RV), a semi-trailer truck, a tractor or other type of farm equipment, a train, a plane, a drone, a helicopter, a personal transport vehicle, and the like. In addition, the techniques described in this disclosure may also apply to any type of computing devices, such as laptop computers, desktop computers, smart phones, wearable devices, tablet computers, or any other device that may or may not be included in a vehicle.

In the example of FIG. 1, computing device 102 includes one or more processors 112, a graphics processing unit (GPU) 114, and memory 116. In some examples, one or more processors 112, GPU 114, and a transceiver module (not shown in FIG. 1) may be formed as an integrated circuit (IC). For example, the IC may be considered as a processing chip within a chip package, and may be a system-on-chip (SoC).

Examples of one or more processors 112, and GPU 114 include, but are not limited to, one or more digital signal processors (DSPs), general purpose microprocessors, application specific integrated circuits (ASICs), field programmable logic arrays (FPGAs), or other equivalent integrated or discrete logic circuitry. One or more processors 112 may represent a central processing unit (CPU) of vehicle 100. In some examples, GPU 114 may be specialized hardware that includes integrated and/or discrete logic circuitry that provides GPU 114 with massive parallel processing capabilities suitable for graphics processing. In some instances, GPU 114 may also include general purpose processing capabilities, and may be referred to as a general purpose GPU (GPGPU) when implementing general purpose processing tasks (i.e., non-graphics related tasks). Although shown as a dedicated GPU 114, GPU 114 may represent an integrated GPU that is integrated into the underlying circuit board (such as a so-called "motherboard"), or otherwise incorporated into one or more processors 112.

In some examples, one or more processors 112 may include processor cores 118A-118M ("processor cores 118"). Each of processor cores may be a separate processing unit of one or more processors 112 on a single integrated circuit, and one or more processors 112 may execute instructions on separate processor cores 118 at the same time.

One or more processors 112 may execute operating system (OS) 130 and various types of applications 125A-125N ("applications 125") stored in memory 116. Examples of applications 125 include virtual assistant applications, navigation applications, such as mapping, music applications, video applications, dashcam applications, over the air (OTA) update applications, or other applications that generate viewable objects for display. Memory 116 may act as system memory for computing device 102 and may store instructions for execution of applications 125. The execution of an application by one or more processors 112 causes one or more processors 112 to produce graphics data for image content that is to be displayed. One or more processors 112 may transmit graphics data of the image content to GPU 114 for further processing based on instructions or commands that one or more processors 112 transmits to GPU 114. In some examples, one or more processors 112 may also execute applications that do not generate viewable objects for display. For example, one or more processors 112 may execute background services, such as background services that act as core components for other applications that do generate viewable objects for display.

One or more processors 112 may communicate with GPU 114 in accordance with an application programming interface (API). Moreover, the techniques described in this disclosure are not required to function in accordance with an API, and one or more processors 112 and GPU 114 may utilize any technique for communicating with GPU 114.

Memory 116 may represent a memory for vehicle 100. Memory 116 may comprise one or more computer-readable storage media. Examples of memory 116 include one or more solid state storage devices that can be used to carry or store desired program code in the form of instructions and/or data structures and that can be accessed by a computer or a processor.

In some aspects, memory 116 may include instructions that cause one or more processors 112 to perform the functions ascribed in this disclosure to one or more processors 112. Accordingly, memory 116 may be a non-transitory computer-readable storage medium having instructions stored thereon that, when executed, cause one or more processors (e.g., one or more processors 112) to perform various functions.

Memory 116 is a non-transitory storage medium. The term "non-transitory" indicates that the storage medium is not embodied in a carrier wave or a propagated signal. However, the term "non-transitory" should not be interpreted to mean that memory 116 is non-movable or that its contents are static. As one example, memory 116 may be removed from vehicle 100, such as in the case of a Secure Digital (SD) card or a Universal Serial Bus (USB) mass storage device, and moved to another device. As another example, memory, substantially similar to memory 116, may be inserted into autonomous vehicle 100. In certain examples, a non-transitory storage medium may store data that can, over time, change.

As shown in FIG. 1, vehicle 100 may include vehicle systems 126. Vehicle systems 126 may include a heating, ventilation, air conditioning (HVAC) system, a temperature regulation system (e.g., which may include heated and/or cooled seats in addition to the HVAC system), a lighting system (for providing interior and/or exterior lighting), a seat control system (for adjusting a position of occupant seating), a mirror control system (for controlling interior and/or exterior mirrors, including rearview mirrors, side mirrors, visor mirrors, etc.), a windshield wiper control system, an entertainment system (for controlling radio playback, video playback, image display, etc.), a safety assistant system (for controlling parking assistance, back-up assistance, etc.), a sun-/moon-roof control system (for controlling sunroofs and/or moonroofs), and any other type of vehicle system capable of control via a one or more processors 112. An example of vehicle systems 126 may include an electronic control unit (ECU), which may control any of the foregoing examples of vehicle systems 126.

As further shown in the example of FIG. 1, vehicle 100 may include a display 120 and a user interface 122, which may be integrated into computing device 102 or may be communicably coupled to computing device 102. Display 120 may represent any type of passive reflective screen on which images can be projected, or an active reflective or emissive or transmissive display capable of displaying images (such as a light emitting diode (LED) display, an organic LED (OLED) display, liquid crystal display (LCD), or any other type of active display). Although shown as including a single display 120, vehicle 100 may include a number of displays that may be positioned throughout a cabin of vehicle 100. In some examples, passive versions of display 120 or certain types of active versions of display 120 (e.g., OLED displays) may be integrated into seats, tables, roof liners, flooring, windows (or in vehicles with no windows or few windows, walls) or other aspects of the cabin of vehicles. When display 120 represents a passive display, display 120 may also include a projector or other image projection device capable of projecting or otherwise recreating an image on passive display 120. Furthermore, display 120 may include displays integrated into driver-side dashboards that virtually represent physical instrument clusters (showing speed, revolutions, engine temperature, etc.).

Display 120 may also represent displays in wired or wireless communication with autonomous vehicle 100. Display 120 may, for example, represent a computing device, such as a laptop computer, a heads-up display, a head-mounted display, an augmented reality computing device or display (such as "smart glasses"), a virtual reality computing device or display, a mobile phone (including a so-called "smart phone"), a tablet computer, a gaming system, or another type of computing device capable of acting as an extension of or in place of a display integrated into vehicle 100.

User interface 122 may represent any type of physical or virtual interface with which a user may interface to control various functionalities of vehicle 100. User interface 122 may include physical buttons, knobs, sliders or other physical control implements. User interface (UI) 122 may also include a virtual interface whereby an occupant of vehicle 100 interacts with virtual buttons, knobs, sliders or other virtual interface elements via, as one example, a touch-sensitive screen, or via a touchless interface. The occupant may interface with user interface 122 to control one or more of a climate within vehicle 100, audio playback by vehicle 100, video playback by vehicle 100, transmissions (such as cell phone calls) through vehicle 100, or any other operation capable of being performed by vehicle 100.

User interface 122 may also represent interfaces extended to display 120 when acting as an extension of or in place of a display integrated into vehicle 100. That is, user interface 122 may include virtual interfaces presented via a heads-up display (HUD), augmented reality computing device, virtual reality computing device or display, tablet computer, or any other of the different types of extended displays listed above.

In the context of vehicle 100, user interface 122 may further represent physical elements used for manually or semi-manually controlling vehicle 100. For example, user interface 122 may include one or more steering wheels for controlling a direction of travel of vehicle 100, one or more pedals for controlling a rate of travel of vehicle 100, one or more hand brakes, etc.

In the example of FIG. 1, one or more processors 112, GPU 114, memory 116, display 120, and user interface 122 may collectively represent, at least in part, what is referred to as a computing device 102. In the automotive context, computing device 102 may represent any integrated or separate computing device capable of interfacing with various aspects of vehicle 100 (e.g., vehicle systems 126) and/or providing entertainment for occupants and/or information regarding vehicle 100 (where such head units may be referred to as "infotainment units" or "infotainment systems").

Each processor core of processor cores 118 may be associated with a respective CPU frequency policy, also referred to herein as CPU statistics or processor statistics. Such CPU frequency policies may be stored on disk of computing device 102, such as in memory 116. The kernel of operating system 130 may expose the available CPU frequency policies, which are files in the CPU frequency policy directories. In some examples, the available CPU frequency polices are at the path/sys/devices/system/cpu/cpufreq/policy{M} in memory 116, where M is a policy ID. Each policy directory contains the following files related to CPU processor statistics for the given policy:

related_cpus—IDs of online/offline CPU cores related to this policy;

affected_cpus—IDs of online CPU cores affected by this policy;

cpuinfo_max_freq—maximum CPU frequency at which the policy can run;

scaling_max_freq—maximum CPU frequency at which the policy can run' cpuinfo_cur_freq—current CPU frequency obtained from the hardware. If the actual frequency cannot be determined, then this file may not exist;

scaling_cur_freq—frequency of the last P-state requested by the scaling driver from the hardware. This may or may be the frequency at which the CPU is actually running; and stats/time_in_state—the amount of CPU time spent in various frequencies supported by the policy since system boot up or frequency stats reset.

The contents of the related_cpus, cpuinfo_max_freq, and scaling_max_freq files are static. That is, these files do not change after the system boots up. As such, these files may be read once after bootup and may not need to be read afterwards.

The cpuinfo_cur_freq and scaling_cur_freq files may specify the frequency at which a CPU is operating at any given instant. However, if operating 130 monitors the CPU frequencies of one or more processors 112 by periodically polling these files, the frequencies reported in these files may not be an accurate representation of the frequencies at which a CPU operated between the polling intervals.

The stats/time_in_state file specifies the amount of CPU time spent in the various frequencies since bootup of the system or since a frequency reset was performed. The statistics provided in this file can be used to derive the CPU time spent in the various frequencies between two different polling intervals. However, the stats/time_in_state file may only be available when the kernel configuration CONFIG CPU FREQ STAT is enabled. Further, the file may report a CPU time spent in the various frequencies even when a processor core or all processor cores associated with a CPU frequency policy are disabled.

In some examples, one or more processors 112 may also be associated with processor mode statistics, which may include statistics regarding the amount of time spent by one or more processors 112 in each of a plurality of processor modes. For example, the kernel may expose, in the /proc/stat file, the amount of CPU time spent in each CPU mode since system boot up or since the CPU was enabled for all online CPU cores. As such, this file may contain the amount of CPU time spent on the idle task by each of processor cores 108. One or more processors 112 may execute operating system 130 to monitor CPU availability by periodically polling the/proc/stat file, and may use the statistics reported in this file to derive the CPU time spent by one or more of processor cores 108 in non-idle and idle modes between two polling periods. The CPU time spent in various CPU modes are not reported by the/proc/stat file for disabled CPU cores, and the CPU time spent in various CPU modes are reset in the/proc/stat file when previously-disabled CPU cores are re-enabled.

It may be difficult to predict future CPU load or CPU availability because resource usage of a CPU is dynamic and may be dependent on the scheduled tasks and how the one or more tasks scheduler for the CPU is implemented. One could use the recent past CPU load to determine the load stability and the CPU availability. When the CPU load is stable for a certain time, the CPU usage from that period can be used as an indicator of the CPU availability.

When the system has multiple CPU cores with varying core sizes, each CPU core's current operating frequencies may be less than the corresponding maximum operating frequency. Thus, the latest per CPU core availability is scaled with respect to the maximum CPU frequency.

In accordance with aspects of the present disclosure, an application, such as application 125A, may schedule one or more tasks to be executed by one or more processors 112. Operating system 130 may execute at one or more processors 112 to monitor the statistics of one or more processors 112, such as by monitoring one or more processor statistics and/or processor mode statistics, to determine whether one or more processors 112 are available to execute the one or more tasks. One or more processors 112 may execute operating system 130 to, in response to determining that one or more processors 112 are available to execute the one or more tasks, schedule the one or more tasks for execution by one or more processors 112 or may otherwise cause one or more processors 112 to execute the one or more tasks.

To determine whether one or more processors 112 are available to execute the one or more tasks, operating system 130 may execute at one or more processors 112 to periodically calculate, such as every N seconds, the processor availability percentage, such as the processor availability percentage of a processor core of processor cores 118, using the following equation:

$$CPU\ \text{Availability}\ \% = \\ 100 - \left(\left(\frac{(N*1000) - \text{milliseconds spent in idle tasks}}{N*1000}\right) * \\ \left(\frac{\text{Current } CPU \text{ frequency}}{\text{Maximum } CPU \text{ frequency}}\right)\right) \quad (1)$$

In equation (1), for a given processor core of processor cores 118, the current CPU frequency may be the current processor frequency for the processor core, and the maximum CPU frequency may be the maximum core frequency for the processor core. The milliseconds spent in idle tasks may be the amount of time the processor core spent being idle since the last time the availability percentage of the processor core was determined, such as the amount of time spent being idle in the last N seconds.

Further, N is multiplied by 1000 in the numerator and denominator in equation (1) because N is specified in seconds in equation (1) and because the time spent in idle tasks is specified as milliseconds spent in idle tasks in equation (1). If N and/or the time spent in idle tasks is specified as another unit of time, N may be multiplied by a different number. For example, if the time spent in idle tasks is specified in nanoseconds in equation (1), N may be multiplied by 100 in equation (1).

In some examples, operating system 130 may execute at one or more processors 112 to determine the current processor frequency for a processor core by calculating the average current processor frequency from the processor time spent in various frequencies, which is reported by the kernel of operating system 130 in the processor statistics for the processor core (e.g., the file /sys/devices/system/cpu/cpufreq/policy{M}/time_in_state, where M is a policy ID). Operating system 130 may read the maximum processor frequency of the processor core from either the cpuinfo_max_freq file or the scaling_max_freq file at the location /sys/devices/system/cpu/cpufreq/policy{M}, where M is a policy ID. Operating system 130 may read the processor time spent in idle tasks and the total processor time can be read from the processor mode statistics (e.g., the/proc/stat file).

In examples where a CPU, such as one or more processors 112, has a plurality of processor cores 118 (e.g., processor cores a to z) with varying operating frequencies, operating system 130 may execute at one or more processors 112 to calculate the average processor availability percentage of one or more processors 112 every N seconds using the following equation:

$$\text{Average } CPU \text{ Availability } \% = \frac{\sum_{i=a}^{z}(F_i * AP_i)}{\sum_{i=a}^{z} F_i} \quad (2)$$

In this equation (2), $AP_i$ is the current availability percentage of processor core i, as determined using equation (1), and $F_i$ is the maximum processor frequency of processor core i. As shown in equation (2), for one or more processors 112 having a plurality of processor cores 118 from a to z, the average processor availability percentage of one or more processors 112 is a function of the sum of the result of multiplying the current availability percent of a processor core with the maximum processor frequency of the processor core for each of processor cores 118, divided by the sum of the maximum processor frequency of the processor core for each of processor cores 118.

In some examples, when the average CPU availability percentage is in the 5% range for a specified period of time, such as for 30 seconds, for 60 seconds, and the like, operating system 130 may determine that the CPU load is stable, and operating system 130 may use the mean CPU availability percentage as the indicator for CPU availability.

Processor cores 118 may not operate at their maximum processor frequencies at all times. The upper limits for the operating frequencies of processor cores 118 may be dependent on various factors, such as the current processor scheduling policy or thermal throttling. As such, one or more processors 112 may take into account the achievable processor frequencies of processor cores 118, which may be based on historical processor statistics, when determining the processor availability for a processor core.

In some examples, one or more processors 112 may track the achievable processor frequency per processor scheduling policy and use such information when calculating the processor availability for processor cores 118 given the current processor scheduling policy. For example, in the above equations (1) and (2), the maximum processor frequency may be the maximum processor frequency specified in the processor frequency policy and/or the achievable maximum processor frequency for the processor core. In addition, in some examples, equations (1) and (2) may be updated to take into account information such as processor thermal information in order to more accurately provide information regarding processor availability.

In this way, operating system 130 may be able to determine the processor availability of one or more processors 112. Operating system 130 may, for one or more tasks to be executed by one or more processors 112, determine, based on the processor statistics and the processor mode statistics, whether one or more processors 112 have the availability to execute the one or more tasks, such as by determining the average processor availability percentage of one or more processor 112. If operating system 130 determines that the average processor availability percentage of one or more processors 112 is above a specified threshold, such as 70%, operating system 130 may determine that one or more processors 112 have the availability to execute the one or more tasks, and operating system 130 may schedule the one or more tasks for execution at one or more processors 112.

In some examples, processor cores 118 may include big and little processor cores. That is, processor cores 118 may include one or more little processor cores that are designed for power efficiency and one or more big processor cores that are designed for compute performance. In some examples, the big and little processor cores are arranged in a big.LITTLE design, and such big and little processor cores may be arranged in any suitable configuration, such as clustered switching, in-kernel switcher, heterogeneous multi-processing, and the like. One or more processors 112 is also referred to throughout this disclosure as a central processing unit (CPU).

In clustered switching, processor cores 118 are arranged into identically sized clusters of big processor cores and little processor cores, and only one cluster in a big.LITTLE cluster pair may be online at any given time. That is, given a pairing of a big cluster of big processor cores and a LITTLE cluster of little processor cores, only one of the two clusters in the cluster pair is online at a given time. Each cluster of processor cores may be associated with a CPU frequency policy, and one or more processors 112 may execute operating system 130 to determine the current CPU frequency from the CPU frequency policy belonging to the online cluster of processor cores 118. One or more processors 112 may also execute operating system to determine the maximum CPU frequency from the CPU frequency policy belonging to the cluster containing the big processor cores. One or more processors 112 may therefore execute operating system 130 to calculate the CPU availability using equations (1) and (2).

When processor cores 118 are arranged in multiple big. LITTLE cluster pairs in a clustered switching configuration, one or more processors 112 may execute operating system 130 to determine the mappings between the big and LITTLE cluster pairs (i.e., which big cluster of processor cores 118 is paired with which LITTLE cluster of processor cores 118) to calculate the CPU availability using equations (1) and (2). Such mappings between the big and LITTLE cluster pairs may be configurable as a resource overlay configuration. The mappings may be specific for a given system on a chip (SoC) (e.g., one or more processors 112), and scheduler implementation. The mappings between the big and LITTLE cluster pairs may not change during runtime of computing device 102, and therefore operating system 130 does not have to update the mappings between the big and LITTLE cluster pairs during runtime.

In the in-kernel switcher configuration, the kernel of operating system 130 pairs a big processor core and a LITTLE processor core of processor cores 118 as a single virtual (or logical) core, and the kernel of operating system 130 may maintain one CPU frequency policy per virtual core. The CPU frequency policy for a virtual core determines the current CPU frequency and the maximum CPU frequency based on the online core and the big core, respectively. When processor cores 118 are arranged according to the in-kernel switcher configuration, one or more processors 112 may therefore execute operating system 130 to calculate the CPU availability of one or more processors 112 using equations (1) and (2) based on the CPU frequency policy for the currently online virtual core.

In the heterogeneous multi-processing configuration, all processor cores 118 may be available at all times, and the kernel scheduler of operating system 130 may schedule tasks for processor cores 118 based on, for example, the CPU load of one or more processors 112. When processor cores 118 are arranged according to a heterogeneous multi-processing configuration, one or more processors 112 may execute operating system 130 calculate the CPU availability of one or more processors 112 based on the CPU frequency policies for processor cores 118 using equations (1) and (2).

In a virtualized environment, a guest operating system kernel may provide CPU frequency information for the virtual CPUs assigned to the guest operating system. One or more processors 112 may execute operating system 130 to calculate the CPU availability of the virtual CPUs using equations (1) and (2) based on such information provided by the guest operating system kernel. Thus the average CPU availability percentage is still valid because the availability is calculated for the virtual CPUs assigned to the guest OS.

In a virtualized environment, the stolen CPU time may vary based on the amount of time the guest operating system spends waiting for a physical processor while the hypervisor is servicing another virtual processor. The stolen CPU time may impact the CPU availability percentage for the guest operating system. The CPU availability calculation in a virtualized environment may therefore include the stolen CPU time. Thus, the average CPU availability percentage in a virtualized environment may reflect the actual percentage of CPU resources available for applications/services running on the guest OS.

In some examples, the kernel of operating system 130 may provide a mechanism for assigning a set of CPUs (e.g., one or more processors 112) and memory nodes, which refer to an online node that contains memory (e.g., memory 116) to a set of tasks. Such a mechanism is referred to as CPU sets or cpusets. Operating system 130 may provide the following CPU sets available for all applications 125 depending on the application state:

Top App—Foreground application running with user focus;

Foreground—All foreground applications; and

Background—All background applications.

Each CPU set may be associated with a CPU frequency policy, and one or more processors 112 may execute operating system 130 to determine the processor availability of a CPU set based on the CPU frequency policy associated with the CPU set. The processors (e.g., processor cores 118 of one or more processors 112) available to each CPU set may vary based on the system configuration. In general, the Top App CPU set contains all available processor cores 118 while Background CPU set contains little processor cores of processor cores 118.

Foreground applications of applications 125 may use an exclusive CPU set that is configured for the Top App or Foreground CPU set, which may be preset by the manufacturer of computing device 102. The exclusive CPU set may guarantee exclusive access to processor cores 118 in these CPU sets for any application of applications 125 executing in the foreground. When an application switches to the background, the application that is switched to the background may lose access to the processor cores 118 in these CPU sets. This mechanism of guaranteeing foreground applications an exclusive CPU set may improve performance of user facing applications in the foreground.

Figure 2A:
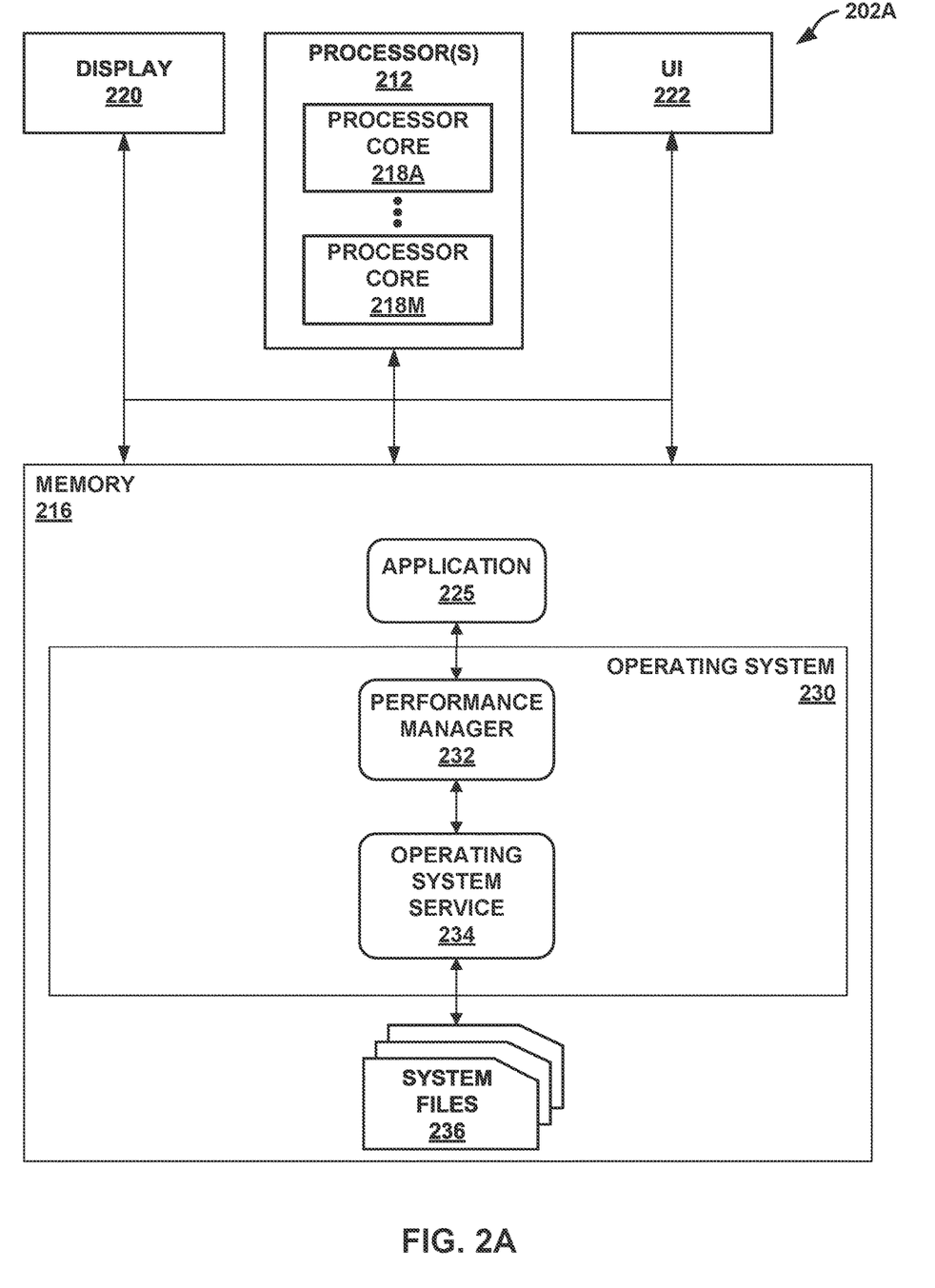
FIGS. 2A and 2B are block diagrams illustrating examples of the computing device of FIG. 1 in more detail.
Figure 2B:
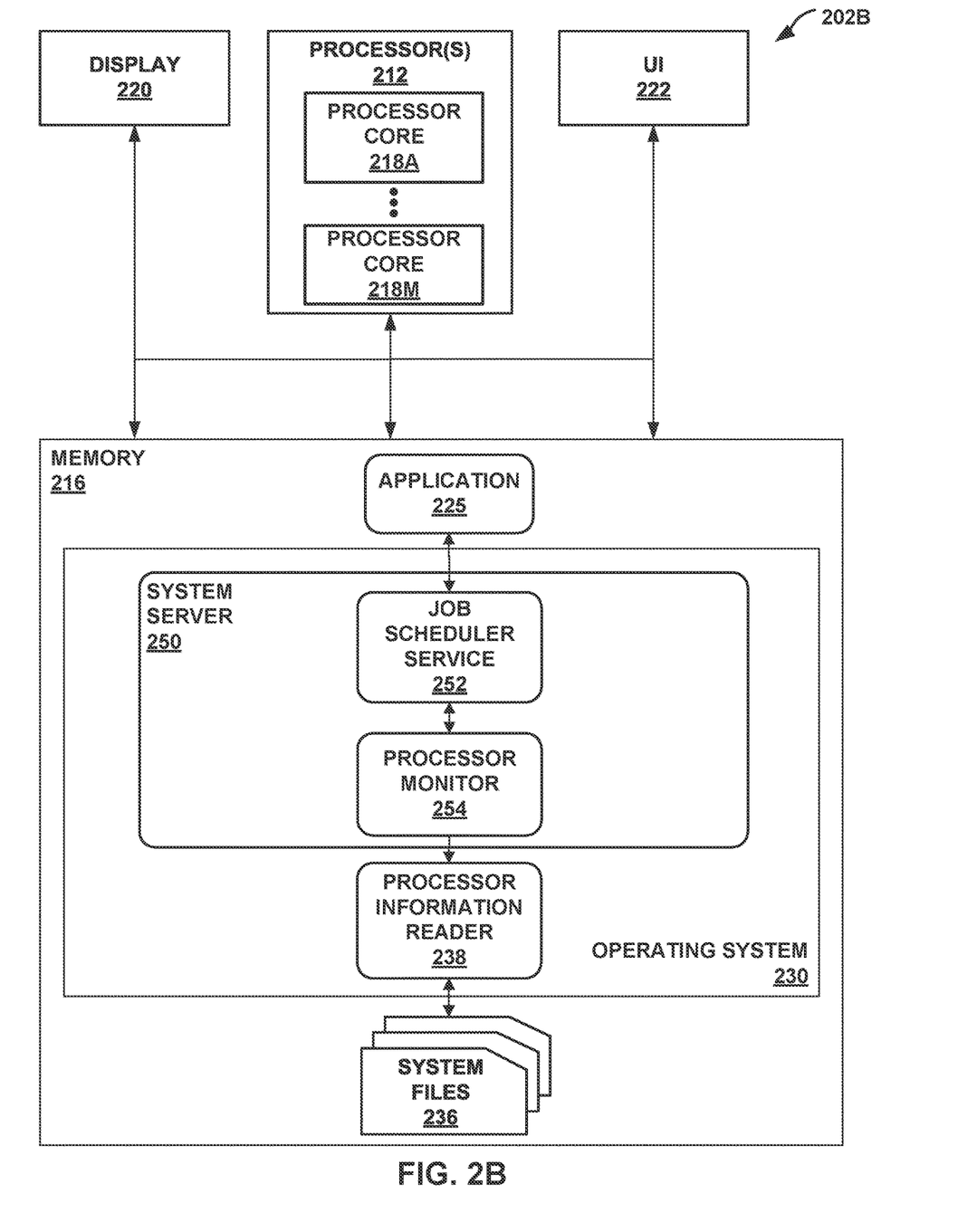

FIGS. 2A and 2B are block diagrams illustrating examples of the computing device 102 of FIG. 1 in more detail. Computing device 202A shown in the example of FIG. 2A is one example of computing device 102 shown in FIG. 1. Computing device 202A may include one or more processors 212, memory 216, display 220 and UI 222. One or more processors 212 is an example of one or more processors 112 shown in FIG. 1 and includes processor cores 218A-218M (processor cores 218), which are examples of processor cores 118 shown in FIG. 1. Memory 216 is an example of memory 116 of FIG. 1. Display 220 is an example of display 120 of FIG. 1. UI 222 is an example of UI 122 of FIG. 1. Memory 216 may include application 225, which is an example of one of applications 125 shown in FIG. 1, operating system 230, which is an example of operating system 130 of FIG. 1, and system files 236.

As shown in FIG. 2A, operating system 230 includes performance manager 232 and operating system service 234. One or more processors 212 may execute software application 225 to register processor availability change listeners with performance manager 232 and/or remove processor availability change listeners from performance manager 232. For example, to execute one or more tasks at one or more processors 212, software application 225 may register a processor availability change listener with performance manager 232 to receive notifications of changes in the processor availability of one or more processors 212.

One or more processors 212 may execute performance manager 232 to, in response to software application 215 registering a processor availability change listener with performance manager 232, send a request to operating system service 234 to start monitoring the processor availability of one or more processors 212. The request may indicate a current listener ID, which may be unique per listener and per instance of performance manager 232, the lower and upper processor availability percentage bounds, and a timeout value.

One or more processors 212 may execute operating system service 234 to, in response to the listener being registered, periodically determine the average processor availability percentage of one or more processors 212, such as every N seconds, according to equations (1) and (2). For example, N seconds may be 30 seconds, 45 seconds, 60 seconds, and the like.

Each time operating system service 234 determines the average processor availability percentage of one or more processors 212, operating system service 234 may read the latest processor statistics from system files 236. Each time operating system service 234 determine the average processor availability percentage of one or more processors 212, operating system service 234 may determine whether the average processor availability percentage has stabilized and whether the average processor availability percentage crosses one of the specified bounds. If operating system service 234 determines that the average processor availability percentage has crossed one of the bounds, operating system service 234 may notify performance manager 232 that the average processor availability percentage has crossed one of the specified bounds.

One or more processors 212 may execute performance manager 232 to, in response to receiving, from operating system service 234, a notification that the average processor availability percentage has crossed one of the specified bounds, correspondingly send a notification to software application 215. For example, if the average processor availability percentage has crossed (e.g., is greater than) the upper bound of the average processor availability percentage, such crossing of the upper bound may indicate to software application 225 that the one or more tasks can be executed by one or more processors 112. As such, software application 225 may, in response to receiving a notification that the average processor availability percentage has crossed the upper bound of the average processor availability percentage, cause the one or more tasks to be executed at one or more processors 212, such as by scheduling the one or more tasks for processing by one or more processors 212.

Computing device 202B shown in the example of FIG. 2B is one example of computing device 102 shown in FIG. 1. Computing device 202B may include one or more processors 212, memory 216, display 220 and UI 222. One or more processors 212 is an example of one or more processors 112 shown in FIG. 1 and includes processor cores 218-218M (processor cores 218), which are examples of processor cores 118 shown in FIG. 1. Memory 216 is an example of memory 116 of FIG. 1. Display 220 is an example of display 120 of FIG. 1. UI 222 is an example of UI 122 of FIG. 1. Memory 216 may include application 225, which is an example of one of applications 125 shown in FIG. 1, operating system 230, which is an example of operating system 130 of FIG. 1, and system files 236.

As shown in FIG. 2B, operating system 230 includes system server 250 that includes job scheduler service 252 and processor monitor 254. Operating system 230 also includes processor information reader 328. One or more processors 212 may execute operating system 230 to periodically determine, such as every N seconds (e.g., every 15 seconds, every 30 seconds, every 60 seconds, etc.), the average processor availability percentage of one or more processors 212, such as by using equations (1) and (2). To determine the average processor availability percentage of one or more processors 212, operating system 230 may read information from system files 236, which may include the files in the/proc and/sys directories, such as the files in the/sys/devices/system/cpu/cpufreq/policy{M} directories, where M is a policy ID, as described throughout this disclosure. One or more processors 212 may execute operating system 230 to read information from system files 236 once every N seconds (e.g., every 15 seconds, every 30 seconds, every 60 seconds, etc.) in order to periodically determine the average processor availability percentage of one or more processors 212.

In some examples, how often operating system 230 determines the average processor availability percentage of one or more processors 212 is configured as a read-only system property of computing device 202B which operating system 230 may be able to adjust based on performance overheads of calculating the average processor availability percentage of one or more processors 212. In some examples, the frequency at which operating system 230 determines the average processor availability percentage of one or more processors 212 varies based on the system state of computing device 202B. For example, the frequency may depend on whether computing device 202B is in a system bootup state, a user switching state, or another state.

In some examples, operating system 230 may collect Perfetto traces while operating system 230 determines the average processor availability percentage of one or more processors 212 to provide insights into the processor overhead for performing these calculations. The processor overhead may be scaled to identify the maximum and minimum processor overhead depending on the device specifications of computing device 202B, the available power saver modes for computing device 202B (e.g., if computing device 202B uses battery power), and the like.

One or more processors 212 may execute software application 225 to perform one or more tasks. In some examples, software application 225 may communicate with job scheduler service 252 to schedule one or more tasks to be executed by one or more processor 212. Job scheduler service 252 may execute to perform scheduling of the one or more tasks of software application 225. To perform scheduling of the one or more tasks, job scheduler service 252 may determine the average processor availability percentage of one or more processors 212 that may be required in order for one or more processors 212 to be available to execute the one or more tasks.

As such, job scheduler service 252 may, in response to software application 223 scheduling one or more tasks, register an associated listener with processor monitor 254 to listen for the average processor availability percentage of one or more processors 212 determined by processor monitor 254. In some examples, job scheduler service 252 may register a processor availability change listener and/or a processor usage listener. The processor availability change listener may listen for processor availability change notifications. Processor monitor 254 may send processor availability change notifications to job scheduler service 252 when the processor availability of one or more processors 212 crosses a threshold, which may be specified in a CpuAvailabilityMonitoringConfig configuration file or another configuration specified by processor monitor 254. For example, processor monitor 254 may determine the value of the processor availability percentage of one or more processors 212 that may indicate one or more processors 212 are available to execute the one or more tasks, and may set the value of the processor availability percentage of one or more processors 212 the threshold.

In some examples, the processor usage listener may listen for processor usage statistics of one or more processors 212. Processor monitor 254 may send the usage statistics to job scheduler service 252 every N seconds, such as every 15 seconds, every 30 seconds, every 60 seconds, and the like.

One or more processors 212 may execute processor monitor 254 to periodically determine the average processor availability percentage of one or more processors 212, such as every N seconds, according to equations (1) and (2). In some examples, processor monitor 254 may start to periodically determine the average processor availability percentage of one or more processors 212, such as every N seconds (e.g., every 15 seconds, every 30 seconds, every 60 seconds, and the like), in response to job scheduler service 252 registering a processor availability change listener.

Each time processor monitor 254 calculates the average processor availability percentage of one or more processors 212, processor monitor 254 may use processor information reader 238 to read the latest processor statistics from system files 236. Processor information reader 238 may include an information reader interface and an information reader daemon. Each time processor monitor 254 calculates the average processor availability percentage of one or more processors 212, processor monitor may communicate with the information reader interface of processor information reader 238, and the information reader daemon of processor information reader 238 may execute to read information from system files 236, and the information reader interface of processor information reader 238 may execute to enable processor monitor 254 to read the information retrieved by the information reader daemon.

Each time processor monitor 254 determine the average processor availability percentage of one or more processors 212, processor monitor 254 may compare the currently determined average processor availability percentage and the average processor availability percentage determined in a previous time period, such as the last 30 seconds, against the average processor availability percentage threshold specified by job scheduler service 252. If the currently determined average processor availability percentage and the average processor availability percentage determined in the previous time period exceed the average processor availability percentage threshold, processor monitor 254 may notify job scheduler service 252, such as by sending an indication that one or more processors 212 are available to perform the one or more tasks.

One or more processors 212 may execute job scheduler service 252 to, in response to receiving an indication that one or more processors 212 are available to perform the one or more tasks, remove the listener and may cause one or more processors 212 to execute the one or more tasks, such as by scheduling the one or more tasks for execution by one or more processors 212. In some examples, processor monitor 254 may continue to execute to periodically determine the average processor availability percentage of one or more processors 212 as long as at least one listener is registered with processor monitor 254. If no listeners are registered with processor monitor 254, processor monitor 254 may cease to determine the average processor availability percentage of one or more processors 212 until a listener is registered with processor monitor 254.

The following are example pseudocode of the various components of operating system 230 illustrated in FIGS. 2A and 2B.

```
CPU Monitor:
package com.android.server.job.cpu;
public final class CpuMonitor {
/** Listener to get CPU availability change notifications. */
public interface CpuAvailabilityChangeListener {
/**
 * Called when the latest or last 30 seconds average CPU availability
 * percent has crossed the
 * {@link CpuAvailabilityMonitoringConfig# m Thresholds} since the last
 * notification.
 *
 * <p>The listener is called at the executor which is specified in
 * {@link CarPerformanceManager#addCpuAvailabilityChangeListener}.
 *
 * @param info CPU availability information.
 */
void onChanged(@NonNull CpuAvailabilityInfo info);
}
/**
 * Adds the {@link CpuAvailabilityChangeListener} for the caller.
 *
 * When the listener is added, the listener will be called to notify the
 current
 * CPU availability percent.
 *
 * @param config CPU availability monitoring config.
 * @param listener implementing {@link CpuAvailabilityChangeListener}
 * interface.
 *
 * @throws IllegalStateException if {@code listener} is already added.
 */
public void addCpuAvailabilityChangeListener(
@CallbackExecutor Executor,
CpuAvailabilityMonitoringConfig config,
CpuAvailabilityChangeListener listener);
/**
 * Removes the {@link CpuAvailabilityChangeListener} for the caller.
 *
 * @param listener implementing {@link CpuAvailabilityChangeListener}
 * interface.
 */
public void removeCpuAvailabilityChangeListener(
CpuAvailabilityChangeListener listener);
/**
 * Returns the current CPU monitoring interval in seconds.
 */
public int getCpuMonitoringIntervalSeconds( );
```

```
/** Listener to get the latest CPU usage stats. */
public interface CpuUsageListener {
/**
* Called when latest CPU usage stats are available.
*
* CPU usage stats are available once every
* {@link getCpuMonitoringIntervalSeconds} seconds.
*/
void onLatestCpuUsageStats(@NonNull CpuUsageStats stats);
}
/**
* Adds the {@link CpuUsageListener} for the caller.
*
* @param listener implementing {@link CpuAvailabilityChangeListener}
* interface.
*
* @throws IllegalStateException if {@code listener} is already added.
*/
public void setCpuUsageListener(
@CallbackExecutor Executor,
CpuAvailabilityMonitoringConfig config,
CpuAvailabilityChangeListener listener);
/**
* Removes the {@link CpuAvailabilityChangeListener} for the caller.
*
* @param listener implementing {@link CpuAvailabilityChangeListener}
* interface.
*/
public void removeCpuUsageListener(CpuAvailabilityChangeListener
listener);
}
```

```
CPU Availability Monitoring Config
package com.android.server.job.cpu;
/** CPU availability monitoring config. */
@DataClass(genToString = true, genBuilder = true,
genHiddenConstDefs = true)
public final class CpuAvailabilityMonitoringConfig {
/** Constant to monitor all cpusets. */
public static final int CPUSET_ALL = 1;
/** Constant to monitor background cpusets. */
public static final int CPUSET_BACKGROUND = 2;
/**
* CPUSETs to monitor.
*/
private int mCpuset = CPUSET_ALL;
/**
* CPU availability percent thresholds.
*
* <p> CPU availability change notifications are sent when the latest or
last
30
* second average CPU availability percent crosses any of these thresholds
since
* the last notification.
*/
private List<int> mThresholds;
}
```

```
CPU Availability Info
package com.android.server.job.cpu;
/** CPU availability information. */
@DataClass(genToString = true, genBuilder = true,
genHiddenConstDefs = true)
public final class CpuAvailabilityInfo implements Parcelable {
/** Constant to indicate missing CPU availability percent. */
public static final int
MISSING_CPU_AVAILABILITY_PERCENT = -1;
/**
* Returns the CPUSET, whose availability info is recorded in this object.
*
* <p>The returned CPUSET value is one of the CPUSET_* constants
from
* {@link CpuAvailabilityMonitoringConfig}
*/
private int mCpuset;
/** Returns the latest average CPU availability percent. */
private int mLatestAvgAvailabilityPercent;
/** Returns the past 30 second average CPU availability percent. */
private
```

```
CPU Usage Stats
package com.android.server.job.cpu;
/** CPU usage stats. */
@DataClass(genToString = true, genBuilder = true,
genHiddenConstDefs = true)
public final class CpuUsageStats {
/**
* List of UID CPU usage stats for all UIDs running in the system since
the last
* update. CPU usage stats are reported only for UIDs with CPU
load >= 1%.
*/
private SparseArray<UidCpuStats> mCpuStatsByUid;
/**
* CPU load used by the entire system since the last update.
*/
private int mTotalCpuLoadPercent;
/**
* CPU usage stats for a UID.
*/
public final class UidCpuStats {
/**
* UID whose CPU stats are reported in this object.
*/
private int mUid;
/**
* CPU load percent used by the UID.
*/
private int mCpuLoadPercent;
}
}
```

```
Car Performance Manager
package android.car.performance;
/** @hide */
@SystemApi
public final class CarPerformanceManager extends CarManagerBase {
/**
* Listener to get CPU availability change notifications.
*
**
<p>Applications implement the listener method to perform one of the following
* actions:
* 1. Execute CPU intensive tasks when the CPU availability percent is above the
* specified upper bound percent.
```

-continued

```
* 2. Stop executing CPU intensive tasks when the CPU availability percent is
* below the specified lower bound percent.
* 3. Handle the CPU availability timeout.
*/
public interface CpuAvailabilityChangeListener {
/**
* Called on one of the following events:
* 1. When the CPU availability percent has reached or decreased below the
* lower bound percent specified at
* {@link CpuAvailabilityMonitoringConfig#getLowerBoundPercent}.
* 2. When the CPU availability percent has reached or increased above the
* upper bound percent specified at
* {@link CpuAvailabilityMonitoringConfig#getUpperBoundPercent}.
* 3. When the CPU availability monitoring has reached the timeout specified
* at {@link CpuAvailabilityMonitoringConfig#getTimeoutInSeconds}.
**
<p>The listener is called at the executor which is specified in
* {@link CarPerformanceManager#addCpuAvailabilityChangeListener}.
**
@param info CPU availability information.
*/
void onCpuAvailabilityChange(@NonNull CpuAvailabilityInfo info);
}
/**
* Adds the {@link CpuAvailabilityChangeListener} for the calling package.
**
@param config CPU availability monitoring config.
* @param listener implementing {@link CpuAvailabilityChangeListener}
* interface.
**
@throws IllegalStateException if {@code listener} is already added.
*/
@RequiresPermission(Car.PERMISSION_COLLECT_CAR_PERFORMANCE_CPU_INFO)
public void addCpuAvailabilityChangeListener(
@NonNull @CallbackExecutor Executor,
@NonNull CpuAvailabilityMonitoringConfig config,
@NonNull CpuAvailabilityChangeListener listener);
/**
* Removes the {@link CpuAvailabilityChangeListener} for the calling package.
**
@param listener implementing {@link CpuAvailabilityChangeListener}
* interface.
*/
@RequiresPermission(Car.PERMISSION_COLLECT_CAR_PERFORMANCE_CPU_INFO)
public void removeCpuAvailabilityChangeListener(
@NonNull CpuAvailabilityChangeListener listener);
}
```

Figure 3:
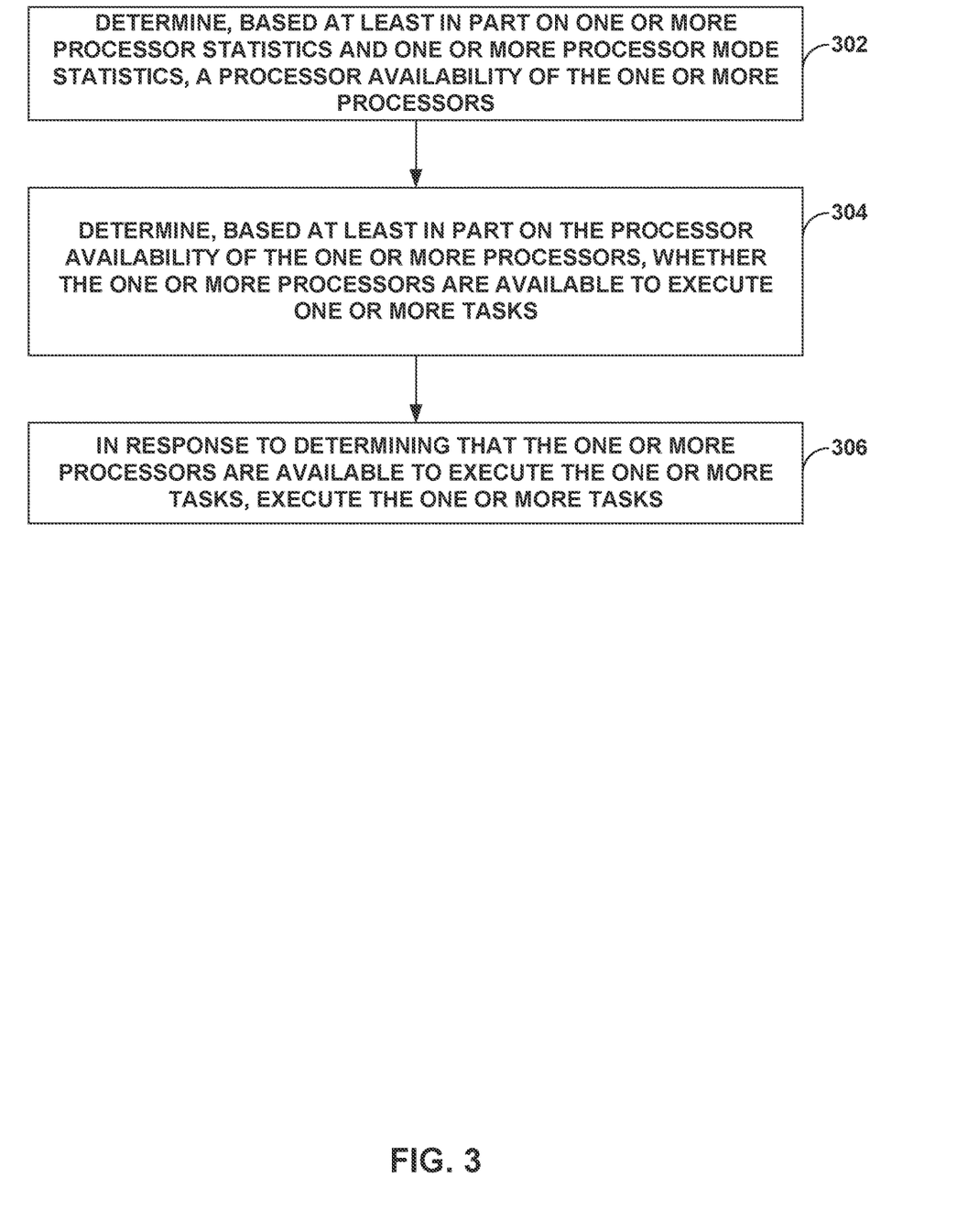
FIG. 3 is a flowchart illustrating example operation of example computing device of FIG. 1 in to manage the disk access usage of applications.

FIG. 3 is a flowchart illustrating example operation of example computing device 102 of FIG. 1 in to manage the disk access usage of applications. FIG. 3 is described with respect to FIG. 1.

As shown in FIG. 3, one or more processors 112 of computing device 102 may determine, based at least in part on one or more processor statistics and one or more processor mode statistics, a processor availability of the one or more processors 112 (302). One or more processors 112 may determine, based at least in part on the processor availability of the one or more processors 112, whether the one or more processors 112 are available to execute one or more tasks (304). One or more processors 112 may, in response to determining that the one or more processors 112 are available to execute the one or more tasks, execute the one or more tasks (306).

In some examples, the one or more processors 112 comprise a plurality of processor cores 118, and to determine the processor availability, the one or more processors 112 may determine, for each of the plurality of processor cores, a respective processor availability, determine an average processor availability of the one or more processors 112 based at least in part on the respective processor availability of each of the plurality of processor cores, and determine, based at least in part on the average processor availability of the one or more processors 112, whether the one or more processors 112 are available to execute one or more tasks.

In some examples, to determine the respective processor availability for each of the plurality of processor cores, the one or more processors 112 may determine, for a processor core of the plurality of processor cores, the respective processor availability as a function of a current processor frequency of the processor core, a maximum processor frequency, and an amount of idle time of the processor core. In some examples, to determine, for the processor core of the plurality of processor cores, the respective processor availability, the one or more processors 112 may determine, based at least in part on the one or more processor statistics, an amount of time spent by the processor core in each of a plurality of processor frequencies, and determine the current processor frequency of the processor core based at least in part on the amount of time spent by the processor core in each of the plurality of processor frequencies.

In some examples, to determine, for the processor core of the plurality of processor cores, the respective processor availability, the one or more processors 112 may determine, based at least in part on the one or more processor mode statistics, the amount of idle time of the processor core.

In some examples, to determine the average processor availability, the one or more processors 112 may determine the average processor availability for the one or more processors 112 as a function of the respective processor availability for each of the plurality of processor cores and a respective maximum processor frequency of each of the plurality of processor cores. In some examples, to determine, for the processor core of the plurality of processor cores, the respective processor availability, the one or more processors 112 may determine a processor availability percentage for the processor core as:

$$100 - \left(\left(\frac{(N*1000) - \text{milliseconds spent in idle tasks}}{N*1000}\right) * \left(\frac{\text{Current processor frequency}}{\text{Maximum processor frequency}}\right)\right),$$

wherein N is the number of seconds since the processor availability percentage was last determined by the one or more processors 112. In some examples, to determine the average processor availability for the one or more processors 112, the one or more processors 112 may determine an average processor availability percentage for the one or more processors 112 as:

$$\frac{\sum_{i=a}^{z}(F_i * AP_i)}{\sum_{i=a}^{z} F_i},$$

wherein the plurality of processor cores range from processor core a to processor core z, wherein $AP_i$ is the average processor percentage for processor core i, and wherein $F_i$ is a maximum processor frequency for processor core i.

In some examples, to, in response to determining that the one or more processors 112 are available to execute the one or more tasks, execute the one or more tasks, the one or more processors 112 may listen, by a software application executing at the one or more processors 112, for indications of the processor availability of the one or more processors 112, determine, by the software application executing at the one or more processors 112 and based at least in part on the indications of the processor availability of the one or more processors 112, whether the one or more processors 112, are available to execute the one or more tasks, and in response to determining that the one or more processors 112, are available to execute the one or more tasks, execute the one or more tasks.

Aspects of this disclosure include the following examples.

Example 1. A method comprising: determining, by one or more processors and based at least in part on one or more processor statistics and one or more processor mode statistics, a processor availability of the one or more processors; determining, by the one or more processors and based at least in part on the processor availability of the one or more processors, whether the one or more processors are available to execute one or more tasks; and in response to determining that the one or more processors are available to execute the one or more tasks, executing, by the one or more processors, the one or more tasks.

Example 2. The method of example 1 wherein the one or more processors comprise a plurality of processor cores, and wherein determining the processor availability comprises: determining, by the one or more processors and for each of the plurality of processor cores, a respective processor availability; determining, by the one or more processors, an average processor availability of the one or more processors based at least in part on the respective processor availability of each of the plurality of processor cores; and determining, by the one or more processors and based at least in part on the average processor availability of the one or more processors, whether the one or more processors are available to execute one or more tasks.

Example 3. The method of example 2, wherein determining the respective processor availability for each of the plurality of processor cores further comprises: determining, by the one or more processors and for a processor core of the plurality of processor cores, the respective processor availability as a function of a current processor frequency of the processor core, a maximum processor frequency, and an amount of idle time of the processor core.

Example 4. The method of example 3, wherein determining, for the processor core of the plurality of processor cores, the respective processor availability further comprises: determining, by the one or more processors and based at least in part on the one or more processor statistics, an amount of time spent by the processor core in each of a plurality of processor frequencies; and determining, by the one or more processors, the current processor frequency of the processor core based at least in part on the amount of time spent by the processor core in each of the plurality of processor frequencies.

Example 5. The method of any of examples 3 and 4, wherein determining, for the processor core of the plurality of processor cores, the respective processor availability further comprises: determining, by the one or more processors and based at least in part on the one or more processor mode statistics, the amount of idle time of the processor core.

Example 6. The method of any of examples 3-5, wherein determining the average processor availability further comprises: determining, by the one or more processors, the average processor availability for the one or more processors as a function of the respective processor availability for each of the plurality of processor cores and a respective maximum processor frequency of each of the plurality of processor cores.

Example 7. The method of example 6, wherein determining, for the processor core of the plurality of processor cores, the respective processor availability further comprises: determining, by the one or more processors, a processor availability percentage for the processor core as: wherein N is the number of seconds since the processor availability percentage was last determined by the one or more processors.

Example 8. The method of example 7, wherein determining the average processor availability for the one or more processors further comprises: determining, by the one or more processors, an average processor availability percentage for the one or more processors as: wherein the plurality of processor cores range from processor core a to processor core z, wherein is the average processor percentage for processor core i, and wherein is a maximum processor frequency for processor core i.

Example 9. The method of any of examples 1-8, wherein in response to determining that the one or more processors are available to execute the one or more tasks, executing the one or more tasks further comprises: listening, by a software application executing at the one or more processors, for indications of the processor availability of the one or more processors; determining, by the software application executing at the one or more processors and based at least in part on the indications of the processor availability of the one or more processors, whether the one or more processors, are available to execute the one or more tasks; and in response to determining that the one or more processors, are available to execute the one or more tasks, executing, by the one or more processors, the one or more tasks.

Example 10. A computing device comprising: memory; and one or more processors communicably coupled to the memory and configured to: determine, based at least in part on one or more processor statistics and one or more processor mode statistics, a processor availability of the one or more processors; determine, based at least in part on the processor availability of the one or more processors, whether the one or more processors are available to execute one or more tasks; and in response to determining that the one or more processors are available to execute the one or more tasks, execute the one or more tasks.

Example 11. The computing device of example 10, wherein the one or more processors comprise a plurality of processor cores, and wherein to determine the processor availability, the one or more processors are further configured to: determine, for each of the plurality of processor cores, a respective processor availability; determine an average processor availability of the one or more processors based at least in part on the respective processor availability of each of the plurality of processor cores; and determine, based at least in part on the average processor availability of the one or more processors, whether the one or more processors are available to execute one or more tasks.

Example 12. The computing device of example 11, wherein to determine the respective processor availability for each of the plurality of processor cores, the one or more processors are further configured to: determine, for a processor core of the plurality of processor cores, the respective processor availability as a function of a current processor frequency of the processor core, a maximum processor frequency, and an amount of idle time of the processor core.

Example 13. The computing device of example 12, wherein to determine, for the processor core of the plurality of processor cores, the respective processor availability, the one or more processors are further configured to: determine, based at least in part on the one or more processor statistics, an amount of time spent by the processor core in each of a plurality of processor frequencies; and determine the current processor frequency of the processor core based at least in part on the amount of time spent by the processor core in each of the plurality of processor frequencies.

Example 14. The computing device of any of examples 12 and 13, wherein to determine, for the processor core of the plurality of processor cores, the respective processor availability, the one or more processors are further configured to: determine, based at least in part on the one or more processor mode statistics, the amount of idle time of the processor core.

Example 15. The computing device of any of examples 12-14, wherein to determine the average processor availability, the one or more processors are further configured to: determine the average processor availability for the one or more processors as a function of the respective processor availability for each of the plurality of processor cores and a respective maximum processor frequency of each of the plurality of processor cores.

Example 16. The computing device of example 15, wherein to determine, for the processor core of the plurality of processor cores, the respective processor availability, the one or more processors are further configured to: determine a processor availability percentage for the processor core as: wherein N is the number of seconds since the processor availability percentage was last determined by the one or more processors.

Example 17. The computing device of example 16, wherein to determine the average processor availability for the one or more processors, the one or more processors are further configured to: determine an average processor availability percentage for the one or more processors as: wherein the plurality of processor cores range from processor core a to processor core z, wherein is the average processor percentage for processor core i, and wherein is a maximum processor frequency for processor core i.

Example 18. The computing device of any of examples 10-17, wherein to, in response to determining that the one or more processors are available to execute the one or more tasks, execute the one or more tasks, the one or more processors are further configured to: listen, by a software application executing at the one or more processors, for indications of the processor availability of the one or more processors; determine, by the software application executing at the one or more processors and based at least in part on the indications of the processor availability of the one or more processors, whether the one or more processors, are available to execute the one or more tasks; and in response to determining that the one or more processors, are available to execute the one or more tasks, execute the one or more tasks.

Example 19. A non-transitory computer-readable storage medium having stored thereon instructions that, when executed, cause one or more processors of a computing device to: determine, based at least in part on one or more processor statistics and one or more processor mode statistics, a processor availability of the one or more processors; determine, based at least in part on the processor availability of the one or more processors, whether the one or more processors are available to execute one or more tasks; and in response to determining that the one or more processors are available to execute the one or more tasks, execute the one or more tasks.

Example 20. The non-transitory computer-readable storage medium of example 19, wherein the one or more processors comprise a plurality of processor cores, and wherein the instructions further cause the one or more processors to: determine, for each of the plurality of processor cores, a respective processor availability; determine an average processor availability of the one or more processors based at least in part on the respective processor availability of each of the plurality of processor cores; and determine, based at least in part on the average processor availability of the one or more processors, whether the one or more processors are available to execute one or more tasks.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
   determining, by one or more processors and based at least in part on one or more processor statistics and one or more processor mode statistics, a processor availability of the one or more processors that comprise a plurality of processor cores, including:
      determining, by the one or more processors and for each processor core of the plurality of processor cores, a respective processor availability as a function of a current processor frequency of the processor core, a maximum processor frequency, and an amount of idle time of the processor core;
   determining, by the one or more processors and based at least in part on the processor availability of the one or more processors, whether the one or more processors are available to execute one or more tasks; and
   in response to determining that the one or more processors are available to execute the one or more tasks, executing, by the one or more processors, the one or more tasks.

2. The method of claim 1 wherein determining the processor availability comprises:
   determining, by the one or more processors, an average processor availability of the one or more processors based at least in part on the respective processor availability of each of the plurality of processor cores; and
   determining, by the one or more processors and based at least in part on the average processor availability of the one or more processors, whether the one or more processors are available to execute one or more tasks.

3. The method of claim 1, wherein determining, for the processor core of the plurality of processor cores, the respective processor availability further comprises:
   determining, by the one or more processors and based at least in part on the one or more processor statistics, an amount of time spent by the processor core in each of a plurality of processor frequencies; and
   determining, by the one or more processors, the current processor frequency of the processor core based at least in part on the amount of time spent by the processor core in each of the plurality of processor frequencies.

4. The method of claim 1, wherein determining, for the processor core of the plurality of processor cores, the respective processor availability further comprises:
   determining, by the one or more processors and based at least in part on the one or more processor mode statistics, the amount of idle time of the processor core.

5. The method of claim 1, wherein determining the average processor availability further comprises:
   determining, by the one or more processors, the average processor availability for the one or more processors as a function of the respective processor availability for each of the plurality of processor cores and a respective maximum processor frequency of each of the plurality of processor cores.

6. The method of claim 5, wherein determining, for the processor core of the plurality of processor cores, the respective processor availability further comprises:
   determining, by the one or more processors, a processor availability percentage for the processor core as:

$$100 - \left(\left(\frac{(N*1000) - \text{milliseconds spent in idle tasks}}{N*1000}\right) * \left(\frac{\text{Current processor frequency}}{\text{Maximum processor frequency}}\right)\right),$$

wherein N is the number of seconds since the processor availability percentage was last determined by the one or more processors.

7. The method of claim 6, wherein determining the average processor availability for the one or more processors further comprises:
   determining, by the one or more processors, an average processor availability percentage for the one or more processors as:

$$\frac{\sum_{i=a}^{z} (F_i * AP_i)}{\sum_{i=a}^{z} F_i},$$

wherein the plurality of processor cores range from processor core a to processor core z, wherein $AP_i$ is the average processor percentage for processor core i, and wherein $F_i$ is a maximum processor frequency for processor core i.

8. The method of claim 1, wherein in response to determining that the one or more processors are available to execute the one or more tasks, executing the one or more tasks further comprises:
   listening, by a software application executing at the one or more processors, for indications of the processor availability of the one or more processors;

determining, by the software application executing at the one or more processors and based at least in part on the indications of the processor availability of the one or more processors, whether the one or more processors, are available to execute the one or more tasks; and in response to determining that the one or more processors, are available to execute the one or more tasks, executing, by the one or more processors, the one or more tasks.

9. A computing device comprising:

memory; and one or more processors communicably coupled to the memory and configured to:

determine, based at least in part on one or more processor statistics and one or more processor mode statistics, a processor availability of the one or more processors that comprise a plurality of processor cores, including:

determining, for each processor core of the plurality of processor cores, a respective processor availability as a function of a current processor frequency of the processor core, a maximum processor frequency, and an amount of idle time of the processor core;

determine, based at least in part on the processor availability of the one or more processors, whether the one or more processors are available to execute one or more tasks; and in response to determining that the one or more processors are available to execute the one or more tasks, execute the one or more tasks.

10. The computing device of claim 9, wherein to determine the processor availability, the one or more processors are further configured to:

determine an average processor availability of the one or more processors based at least in part on the respective processor availability of each of the plurality of processor cores; and determine, based at least in part on the average processor availability of the one or more processors, whether the one or more processors are available to execute one or more tasks.

11. The computing device of claim 9, wherein to determine, for the processor core of the plurality of processor cores, the respective processor availability, the one or more processors are further configured to:

determine, based at least in part on the one or more processor statistics, an amount of time spent by the processor core in each of a plurality of processor frequencies; and determine the current processor frequency of the processor core based at least in part on the amount of time spent by the processor core in each of the plurality of processor frequencies.

12. The computing device of claim 9, wherein to determine, for the processor core of the plurality of processor cores, the respective processor availability, the one or more processors are further configured to:

determine, based at least in part on the one or more processor mode statistics, the amount of idle time of the processor core.

13. The computing device of claim 9, wherein to determine the average processor availability, the one or more processors are further configured to:

determine the average processor availability for the one or more processors as a function of the respective processor availability for each of the plurality of processor cores and a respective maximum processor frequency of each of the plurality of processor cores.

14. The computing device of claim 13, wherein to determine, for the processor core of the plurality of processor cores, the respective processor availability, the one or more processors are further configured to:

determine a processor availability percentage for the processor core as:

$$100 - \left(\left(\frac{(N*1000) - \text{milliseconds spent in idle tasks}}{N*1000}\right) * \left(\frac{\text{Current processor frequency}}{\text{Maximum processor frequency}}\right)\right),$$

wherein N is the number of seconds since the processor availability percentage was last determined by the one or more processors.

15. The computing device of claim 14, wherein to determine the average processor availability for the one or more processors, the one or more processors are further configured to:

determine an average processor availability percentage for the one or more processors as:

$$\frac{\sum_{i=a}^{z}(F_i * AP_i)}{\sum_{i=a}^{z} F_i},$$

wherein the plurality of processor cores range from processor core a to processor core z, wherein $AP_i$ is the average processor percentage for processor core i, and wherein $F_i$ is a maximum processor frequency for processor core i.

16. The computing device of claim 9, wherein to, in response to determining that the one or more processors are available to execute the one or more tasks, execute the one or more tasks, the one or more processors are further configured to:

listen, by a software application executing at the one or more processors, for indications of the processor availability of the one or more processors;

determine, by the software application executing at the one or more processors and based at least in part on the indications of the processor availability of the one or more processors, whether the one or more processors, are available to execute the one or more tasks; and in response to determining that the one or more processors, are available to execute the one or more tasks, execute the one or more tasks.

17. A non-transitory computer-readable storage medium having stored thereon instructions that, when executed, cause one or more processors of a computing device to:

determine, based at least in part on one or more processor statistics and one or more processor mode statistics, a processor availability of the one or more processors that comprise a plurality of processor cores, including:

determining, by the one or more processors and for each processor core of the plurality of processor cores, a respective processor availability as a function of a current processor frequency of the processor core, a maximum processor frequency, and an amount of idle time of the processor core;

determine, based at least in part on the processor availability of the one or more processors, whether the one or more processors are available to execute one or more tasks; and in response to determining that the one or more processors are available to execute the one or more tasks, execute the one or more tasks.

18. The non-transitory computer-readable storage medium of claim 17, wherein the instructions further cause the one or more processors to:

determine an average processor availability of the one or more processors based at least in part on the respective processor availability of each of the plurality of processor cores; and determine, based at least in part on the average processor availability of the one or more processors, whether the one or more processors are available to execute one or more tasks.

* * * * *